United States Patent [19]
Serpinet et al.

[11] Patent Number: 6,031,703
[45] Date of Patent: Feb. 29, 2000

[54] PROTECTION RELAY AND PROCESS

[75] Inventors: Marc Serpinet, Monchaboud; Laurent Previeux, Grenoble; Jean-Jacques Favre, Revel, all of France

[73] Assignee: Schneider Electric SA, France

[21] Appl. No.: 09/014,249

[22] Filed: Jan. 27, 1998

[30] Foreign Application Priority Data

Feb. 10, 1997 [FR] France ................................ 97 01698

[51] Int. Cl.$^7$ ................................................ H02H 5/04
[52] U.S. Cl. ........................................................ 361/103
[58] Field of Search ............................... 361/24, 31, 25, 361/27, 103, 106

[56] References Cited

U.S. PATENT DOCUMENTS

| | | | |
|---|---|---|---|
| 4,683,515 | 7/1987 | Beihoff et al. | 361/106 |
| 5,115,371 | 5/1992 | Tripodi | 361/106 |

OTHER PUBLICATIONS

Patent Abstracts of Japan vol. 017, No. 152 (E–1340), Mar. 25, 1993 & JP 04 317511 A (Mitsubishi Electric Corp), Nov. 9, 1992 *abstract*.

Database WPI, Section PQ, Week 9404, Derwent Publications Ltd., London, GB.; Class Q14, AN 94–033594 XP002044396 & SU 1 786 585 A (Rost Rail Eng Inst), Jan. 7, 1993 *abstract*.

*Primary Examiner*—Ronald W. Leja
*Attorney, Agent, or Firm*—Parkhurst & Wendel, L.L.P.

[57] ABSTRACT

The protection relay comprises a processing unit and temperature sensors associated to conductors, an ambient temperature sensor, and setting devices connected to circuits which perform tripping functions. A first short delay tripping circuit supplies a tripping order to a relay if a value of the temperature variation of a conductor exceeds a first setting threshold. A second long delay tripping circuit supplies a tripping order to the relay if a value of the temperature difference between the temperature of a conductor and the ambient temperature exceeds a second setting threshold. The protection relay is used notably for trip devices and circuit breakers.

11 Claims, 7 Drawing Sheets

PROTECTION RELAY AND PROCESS

BACKGROUND OF THE INVENTION

The invention relates to a protection relay comprising a processing unit connected to means for measuring supply signals representative of heat rises caused by the flow of currents in electrical conductors, and means connected to the processing units for setting and supplying values representative of protection thresholds.

Known protection relays, such as electronic trip devices for circuit breakers, enable electrical contacts to be opened in order to protect an installation. The trip devices generally comprise current sensors connected to a processing unit which performs protection functions. The processing unit makes a trip relay operate when a signal supplied by the current sensors exceeds a threshold for a preset duration.

Certain trip devices comprise temperature sensors connected to the processing unit. These sensors supply a temperature signal to enable a current to be interrupted when an excessive heat rise occurs in the circuit breaker.

Temperature sensors can also be used to determine the thermal memory of an installation. A device of this kind, described in European Patent EP 0 421 892 B, proposes simulation of cooling after the circuit breaker contacts have opened.

Long delay tripping functions can use temperature signals but the tripping thresholds are not very precise and the time delay setting possibilities are fairly limited. Therefore trip devices often combine a very precise protection by measuring current and a complementary or redundant protection by measuring temperature.

Furthermore, known tripping functions use temperature signals which do not allow a short delay protection.

SUMMARY OF THE INVENTION

The object of the invention is to achieve a protection relay and process using temperature signals for improved tripping functions.

In a relay according to the invention, the processing unit comprises first means for thermal protection connected to first means for setting and supplying a first setting signal representative of a first threshold, and connected to first means in thermal contact with at least one conductor, for measuring and supplying a first signal representative of the temperature of said conductor, said first means for protection supplying a tripping signal when a value representative of the variation of the first temperature signal exceeds a value representative of the first setting signal representative of the first threshold.

In a preferred embodiment, the processing unit comprises second means for thermal protection connected to second means for setting supplying a second setting and signal representative of a second threshold to the first means for measuring, and to second means for measuring at a distance from the conductors to be protected and supplying a second temperature value representative of an ambient temperature, said second means for protection supplying a tripping signal when a value representative of the temperature difference between the first temperature value supplied by the first means for measuring and the second temperature value supplied by the second means for measuring exceeds a value representative of the second setting signal representative of the second threshold.

Preferably, the second means for protection comprise means for determining a quantity representative of a temperature difference having inputs connected to the first and second means for measuring and an output supplying the value representative of the difference between the first temperature value supplied by the first means for measuring and the second temperature value supplied by the second means for measuring.

According to an alternative embodiment, the first means for protection are connected to the output of the means for determining a quantity representative of a temperature difference.

According to a particular embodiment, the processing unit comprises third means for thermal protection, connected to the first means for measuring, and supplying a tripping signal when a value representative of the temperature supplied by the first means exceeds a preset third threshold.

According to a first development of the invention, the processing unit comprises means for correction having inputs connected to the first means for setting, to the second means for setting and to means for determining a quantity representative of a temperature difference, and an output connected to the first means for thermal protection, said means for correction modifying the first setting signal representative of a first threshold according to the value of the second threshold and to the value representative of a temperature difference.

According to a second development of the invention, the first means for thermal protection comprise means for performing differential calculus receiving an input signal representative of the temperature signal supplied by the first means for measuring and supplying an output signal representative of the variation of the input signal.

Preferably, the means for performing differential calculus comprise a sampler receiving the input signal, a buffer register connected to the sampler to store a preset number of last samples, a minimum detector connected to the buffer and supplying the value of a stored sample of lowest value, and means for calculating a difference having inputs connected to the sampler and to the minimum detector and an output supplying the output signal representative of the difference between the last sample and the minimum value of the last stored samples.

A process according to the invention comprises:

a stage in which the temperature of at least one conductor is measured, a stage in which the temperature variation of at least one conductor is calculated, and a tripping control stage according to the value of said temperature variation.

A development of the process comprises:

a stage in which the ambient temperature is measured, a stage in which the difference between values of the temperature of at least one conductor and values of the ambient temperature is calculated, and a tripping control stage according to the value of the temperature difference.

BRIEF DESCRIPTION OF THE DRAWINGS

Other advantages and features will become more clearly apparent from the following description of particular embodiments of the invention given as non-restrictive examples only and represented in the accompanying drawings in which.

DETAILED DESCRIPTION OF THE PREFERRED EMBODIMENT

Figure 1:
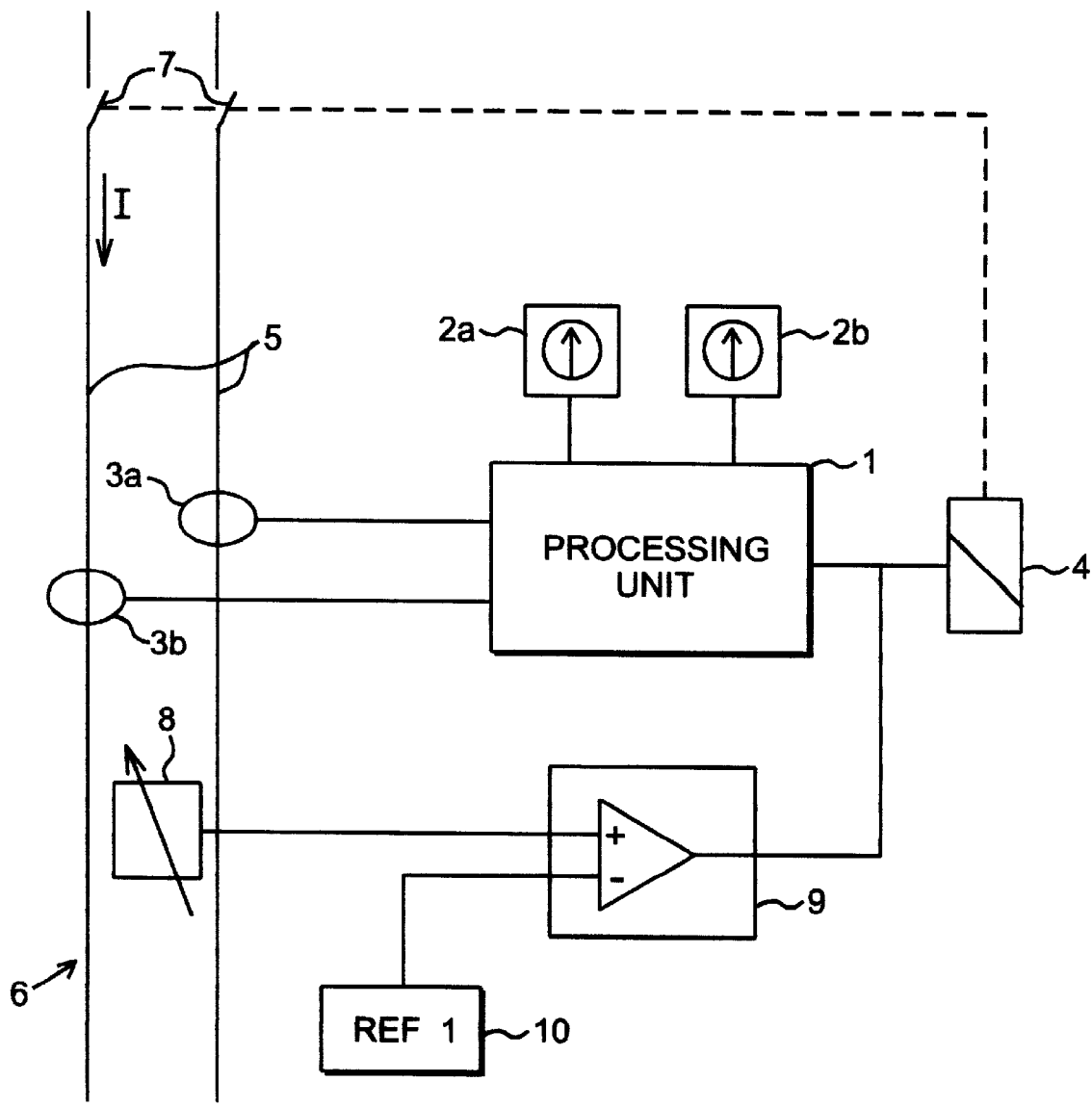
FIG. 1 represents a diagram of a known protection relay.

A protection relay of known type, represented in FIG. 1, comprises a processing unit 1 connected to setting devices 2a and 2b, current sensors 3a and 3b and a trip relay 4. The current sensors are arranged on main conductors 5 of a power system 6 to be protected.

The trip relay commands opening of contacts 7 connected in series with the main conductors 5. When a current signal supplied by the sensors exceeds thresholds or time delays preset by the setting devices 2a and 2b, the processing unit commands the relay 4 to open of the contacts 7 and interrupt of a current I in the power system 6.

When the protection relay is a trip device in a circuit breaker, a temperature sensor 8 supplies a signal representative of the heat rise of said circuit breaker. Means for comparison 9, connected to the temperature sensor 8 and to a reference 10, command the trip relay to open contacts 7 if the temperature signal exceeds a threshold supplied by the reference 10.

In the diagram of FIG. 1, protection by current measurement is used in conjunction with protection by temperature measurement. The protection by temperature measurement is in this case used essentially to protect the circuit breaker.

In known trip devices, the protection by temperature measurement does not enable long delay thermal tripping functions or short delay thermal tripping functions to be performed.

Furthermore, most protection relays by current measurement operate on AC power systems. To operate on all types of power systems, known protection relays must have complex and onerous current sensors.

In a protection relay according to the invention, protections by temperature measurement enable long delay and short delay protection functions to be provided for DC or AC power systems.

Figure 2:
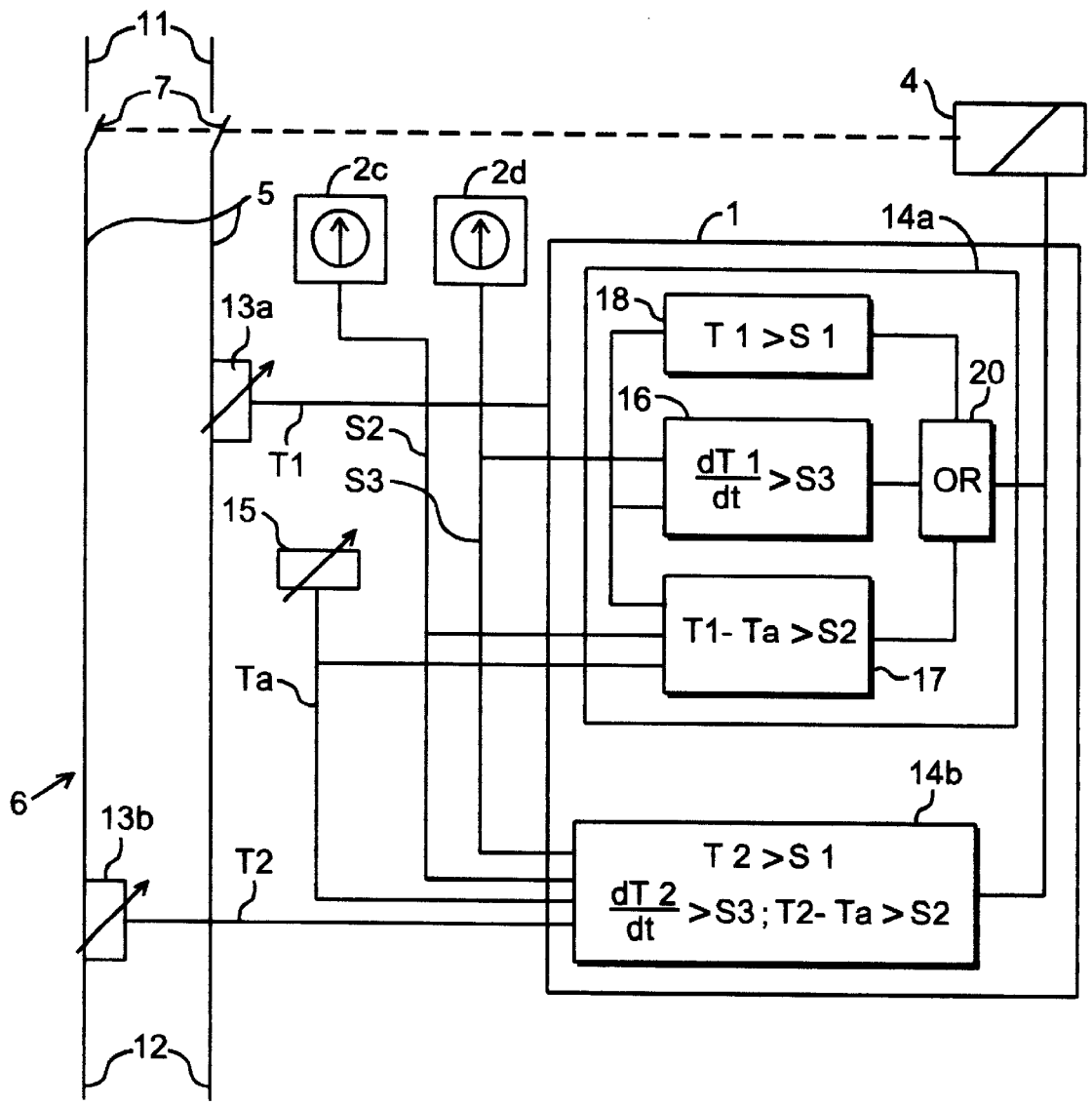
FIG. 2 represents a diagram of a protection relay according to the invention.

The diagram of a protection relay according to an embodiment of the invention is represented in FIG. 2. In this diagram, the protection relay is fitted in a circuit breaker comprising input terminals 11 and output terminals 12 to which conductors of a power system are connected. Between the input and output terminals, main conductors 5 are connected in series with contacts 7.

In this embodiment, temperature sensors 13a and 13b connected to the main conductors 5 are connected to the processing unit 1. The current sensors supply signals T1 and T2 representative of the temperatures of each conductor while guaranteeing electrical isolation between said conductors and the protection relay.

The processing unit 1 of the protection relay comprises a group of protection functions for each conductor. A first group 14a of protection functions processes the signals coming from the sensor 13a and a second group 14b processes the signals coming from the sensor 13b.

A temperature sensor 15, connected to the processing unit 1, supplies signals representative of an ambient temperature Ta to the tripping functions of the groups 14a and 14b. The sensor 15 is placed in a location away from the conductors. If the sensor 15 is in a circuit breaker, it can be located towards the front panel.

Setting devices 2c and 2d respectively supply signals representative of long delay and short delay thresholds to the tripping functions.

Each group of tripping functions comprises a short delay protection circuit 16 receiving a temperature signal T1 supplied by a sensor, for example the sensor 13a, and a short delay threshold signal S3 supplied by the setting device 2d.

The short delay protection circuit 16 supplies a tripping order via a gate 20 when the variation of the temperature signal exceeds the short delay threshold S3. The variation of the temperature signal can be determined by differentiation of the temperature signal T1.

The long delay tripping function is performed by a protection circuit 17 receiving the temperature signal T1 supplied by a sensor associated to the conductors, a long delay threshold signal S2 supplied by the setting device 2c, and an ambient temperature signal Ta supplied by the temperature sensor 15.

The long delay protection circuit 17 supplies a tripping order to the relay via the gate 20 when a temperature difference between the temperature of a conductor 5 and the ambient temperature exceeds a threshold value of the long delay setting device 2c. To perform this long delay protection function, the circuit 17 calculates the difference between the signals T1 and Ta supplied by the sensors respectively 13a and 15 then compares this difference with the threshold signal S2 supplied by the setting device 2c.

A third tripping function enables the conductors 5 to be protected against an excessive temperature rise. This function is performed by a protection circuit 18 connected to the temperature sensor 13a associated to the conductor. This circuit gives a tripping order to the relay 4 via the gate 20 when the temperature signal T1 exceeds a preset threshold S1.

The constitution and operation of the group 14b are identical to those of the group 14a described above. The conductor temperature signal of the group of functions 14b is supplied by the sensor 13b.

Figure 3:
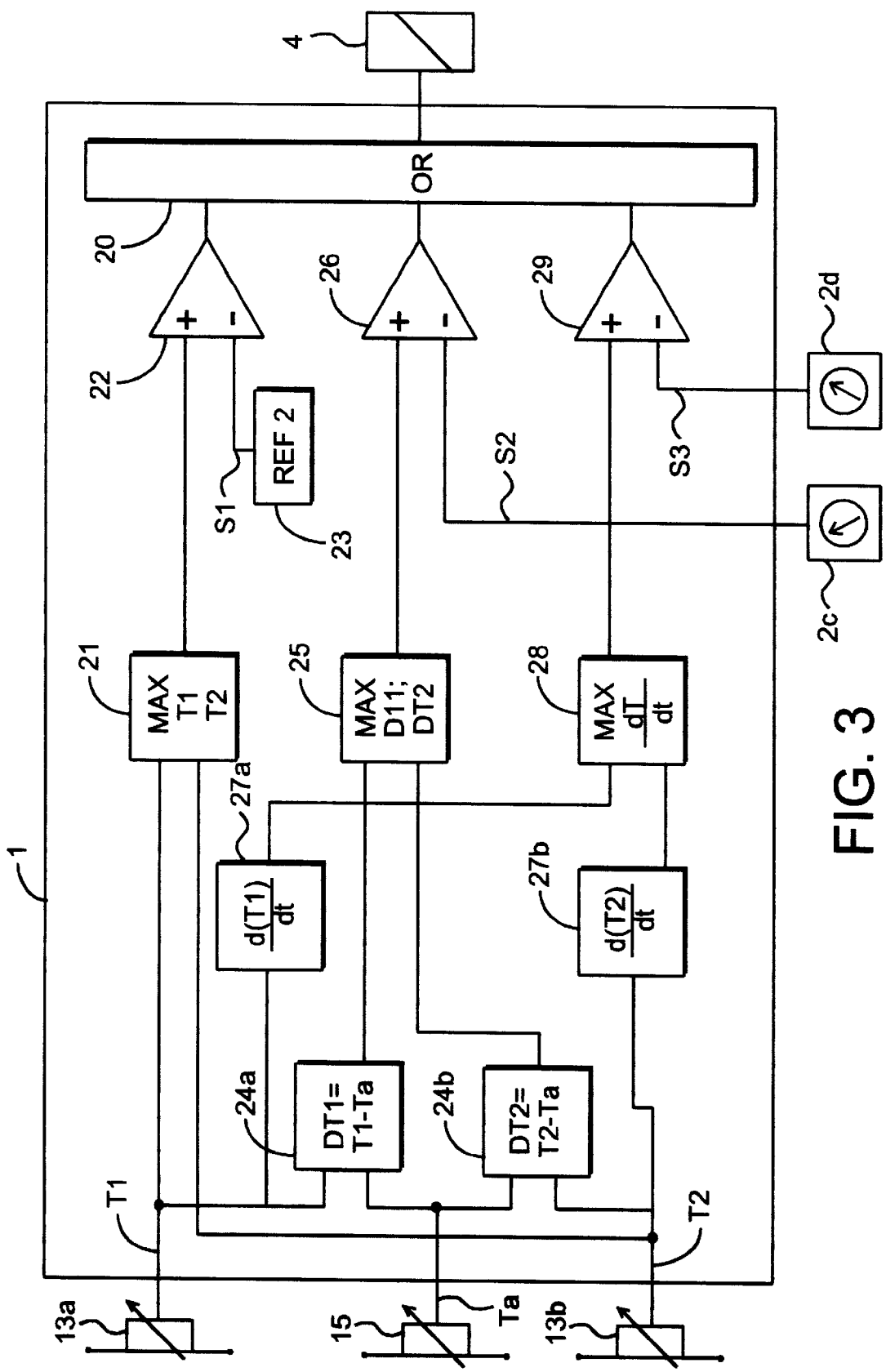
FIGS. 3 and 4 represent two diagrams of processing units of a relay according to the invention.

FIG. 3 shows the block diagram of a processing unit where the temperature signals from the sensors 13a and 13b are processed in grouped manner. In this processing unit, maximum value detectors enable the total number of circuits to be reduced.

The processing unit of FIG. 3 comprises a first maximum detector 21 connected to the sensors 13a and 13b and supplying on an output a signal representative of the maximum value of the temperature values respectively T1 and T2 supplied by said sensors. A comparator 22 is connected to the output of the maximum detector 21 and to a reference 23 supplying the tripping threshold S1. If one of the temperatures T1 or T2 exceeds the value of the threshold S1, the comparator 22 sends a tripping signal to the relay 4 via the gate 20.

For the long delay tripping functions, the processing unit comprises a first difference calculation circuit 24a connected to the sensors 13a and 15, a second difference calculation circuit 24b connected to the sensors 13b and 15, and a second maximum detector 25 connected to outputs of the first and second difference calculation circuits 13a and 13b. A comparator 26 has a first input connected to an output of the detector 25 and a second input connected to the setting device 2c supplying a long delay threshold signal S2.

The circuit 24a calculates a temperature difference DT1 between the temperature value T1 supplied by the sensor 13a and the ambient temperature value Ta supplied by the sensor 15. The circuit 24b calculates a temperature difference DT2 between the temperature value T2 supplied by the sensor 13b and the value of Ta. Thus DT1 represents T1–Ta and DT2 represents T2–Ta. DT1 and DT2 are applied to the inputs of the detector 25. If one of the values DT1 or DT2 exceeds the threshold S2, the comparator 26 sends a tripping signal to the relay 4 via the gate 20.

For the short delay tripping functions, the processing unit comprises a first circuit 27a and a second circuit 27b for temperature variation calculation. The temperature variation is calculated by differentiation of the temperature signals supplied by the detectors 13a and 13b. The circuit 27a connected to the sensor 13a calculates a variation dT1/dt of the temperature T1 with respect to time dt, and the circuit 27b connected to the sensor 13b calculates a variation dT2/dt of the temperature T2. The outputs of each circuit 27a and 27b are connected to inputs of a third maximum detector 28. A comparator 29 has a first input connected to an output of the detector 28 and a second input connected to the setting device 2d supplying a short delay threshold signal S3.

The detector 28 supplies the maximum value of the variations dT1/dt or dT2/dt to the comparator 29. If one of the variations of T1 (dT1/dt) or of T2 (dT2/dt) exceeds the threshold S3, the comparator 29 supplies a tripping signal to the relay 4 via the gate 20.

Figure 4:
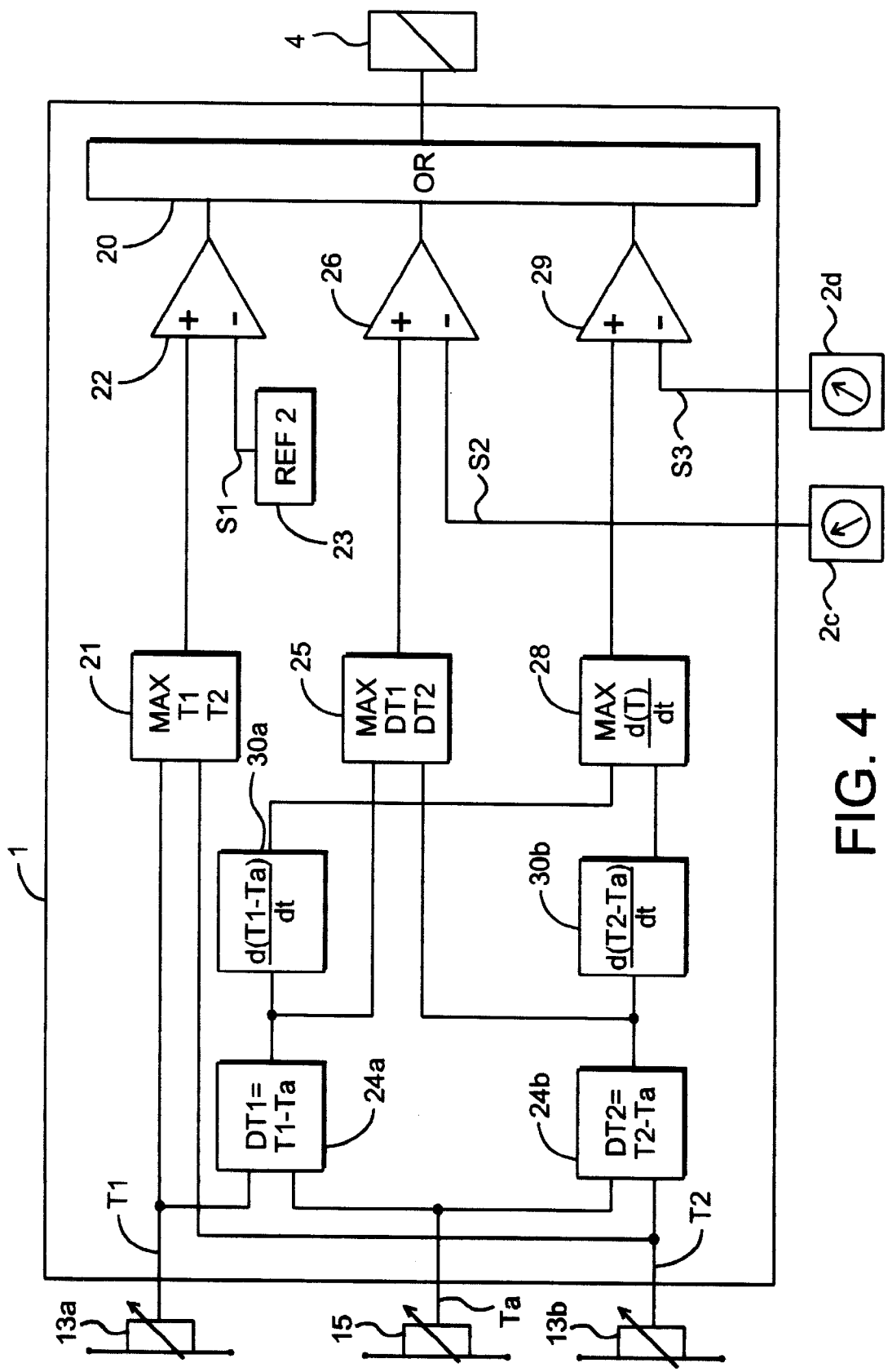

FIG. 4 shows another embodiment of a processing unit of a relay according to the invention. In this diagram, the circuits 27a and 27b have been replaced by other variation calculation circuits 30a and 30b. The circuit 30a has an input connected to the output of the circuit 24a, and the circuit 30b has an input connected to the output of the circuit 24b. Outputs of each circuit 30a and 30b are connected to the inputs of the third maximum detector 28.

In this embodiment, the variation calculation circuits 30a and 30b use the values of the temperature differences respectively DT1 and DT2. When an overload or shortcircuit current flows in said conductor, the ambient temperature varies less quickly than the temperature of a conductor. Thus, calculation of the temperature variation d(T1–Ta)/dt or d(T2–Ta)/dt of a quantity representative of the temperature difference DT1 or DT2 is only slightly different from calculation of the variation d(T1)/dt or d(T2)/dt of the temperature T1 or T2 of the conductor.

However, calculation of the variation of d(T1–Ta)/dt or d(T2–Ta)/dt is performed on lower values (T1–Ta<T1 and T2–Ta<T2) and the precision of calculation can be greater. In addition, as the values are lower, the calculations are quicker to perform and occupy less memory space when these functions are performed by programmed circuits.

Figure 5:
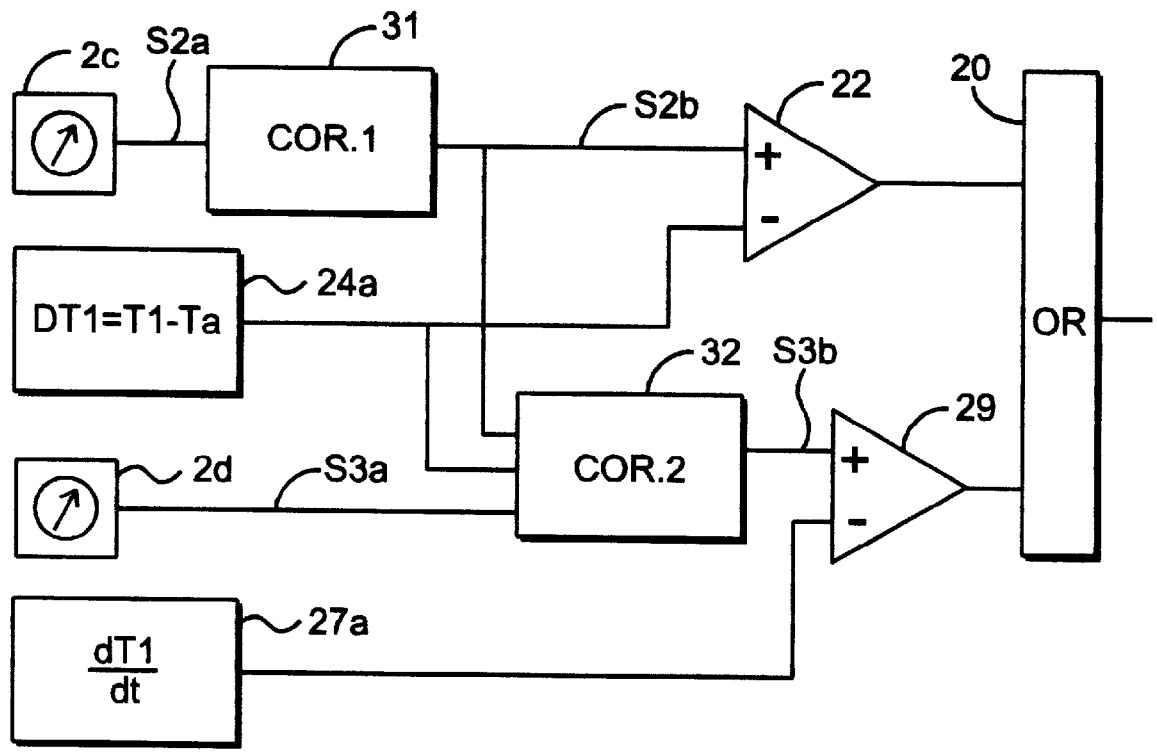
FIG. 5 represents means for correction able to be implemented in relays according to the invention.

The temperature deviations between the temperature of a conductor and the ambient temperature of a circuit breaker are not proportional to the current flowing through said conductor. To take this non-linear response into account, the device 2c supplying a long delay protection threshold should preferably supply signals representative of the heat rise produced by a current value displayed on said device 2c. If the device supplies signals representative of current, a conversion circuit 31 converts the signals S2a representative of current into signals S2b representative of heat rise. In FIG. 5, the conversion circuit 31 is connected between the device 2c and the comparator. In this diagram, the comparator compares the temperature difference signal DT1 supplied by the circuit 24a and the corrected threshold signal S2b.

The temperature variations, when an electrical conductor is cold and when an overload or short-circuit current occurs, are greater than temperature variations when said conductor is hot. To take account of the initial situation of the circuit breaker when an electrical fault occurs, the processing unit comprises a correction circuit 32.

Thus, for a short delay threshold preset by means of the device 2d, the tripping threshold signal S3 supplied to the comparator will be higher if the conductor is cold and lower if the conductor is hot.

In the diagram of FIG. 5, a correction circuit 32 is connected between the input of the comparator 29 receiving the threshold value for short delay tripping on the temperature variation, and the setting device 2d. The circuit 32 is also connected to the circuit 31 to receive a signal representative of the long delay threshold, for example S2b, and to the circuit 24a to receive signals representative of the conductor temperatures T1 and of the ambient temperature Ta. Thus, the correction circuit 32 receives a threshold signal S3a from the device 2d and supplies a corrected threshold value S3b to the comparator. Correction is performed according to the long delay threshold value and to the conductor temperature. Use of the ambient temperature Ta and of the temperature difference T1–Ta improves the precision of the correction.

In other embodiments, the correction circuit can be connected directly to the setting device 2c to receive the long delay threshold value and to the sensor 13a or 13b to have the temperature value of the conductors.

Figure 6:
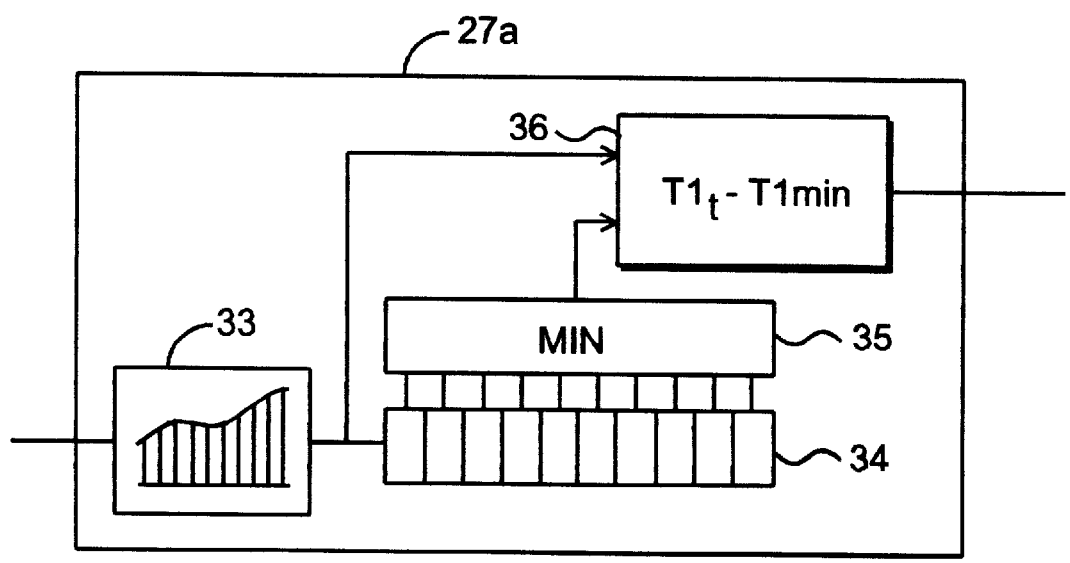
FIG. 6 represents a means for performing differential calculus able to be implemented in relays according to the invention.

FIG. 6 shows an embodiment of a variation calculation circuit 27a. This diagram can be identical for the circuits 27b, 30a and 30b. The variation calculation circuit comprises on input a sampler 33 to sample the input signal. A storage circuit 34 connected to an output of the sampler stores in memory a preset number of last samples of signals. A minimum detection circuit 35 is connected to the storage circuit. This circuit 35 supplies on its output the lowest value among the last samples stored. Then a calculation circuit 36 having a first input connected to the sampler and a second input connected to the circuit 35 calculates the difference between the value of a sample T1t supplied by the sampler and the lowest value T1 min of one of the last samples stored.

In this embodiment the circuit 27a enables a greater dynamic measurement range and a higher precision to be achieved when the temperature variations are very small. For example, if the number of samples stored is 10, a slow temperature variation can be detected with precision after ten samples, the deviation between the first and tenth sample being greater than the deviation between two consecutive samples. Rapid variations are automatically detected from the first samples taken as the deviation is great. Thus, for strong currents in the conductors, the short delay protection enables high-speed tripping to be performed.

Figure 7:
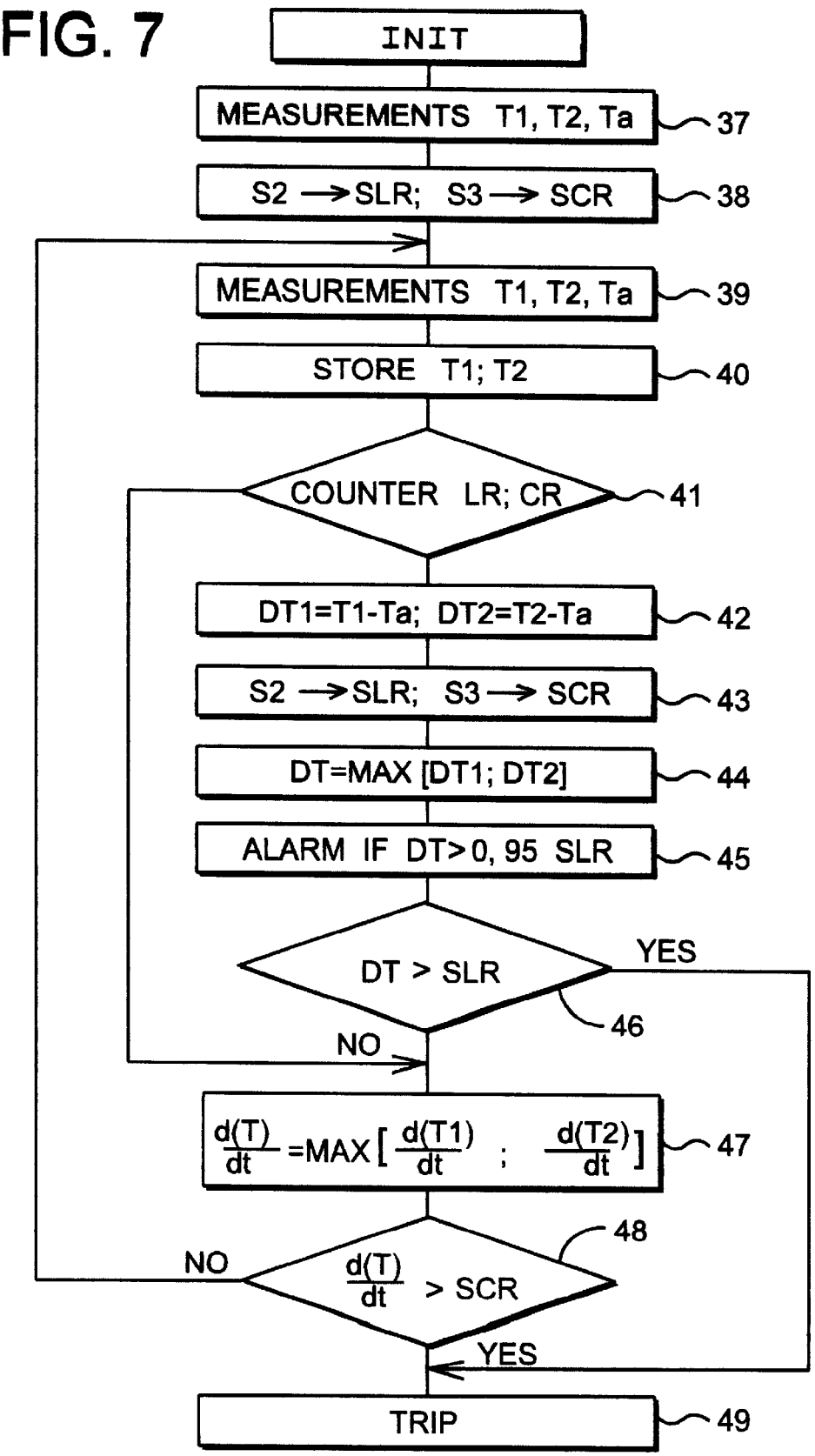
FIG. 7 represents a flow chart of operation of a processing unit of a relay according to the invention.

The tripping functions are preferably performed in programmed form in microprocessors or microcontrollers. A flow chart represented in FIG. 7 shows protection processes able to be implemented in relays according to the invention.

In an initialization phase, the processing unit samples the values of the temperature signals T1, T2, Ta (stage 37) and reads the threshold values S2 and S3 to determine long delay threshold values SLR and short delay threshold values SCR (stage 38).

Then, at each operating cycle, the temperature values T1, T2, Ta are sampled (stage 39) and the last samples of T1 and T2 are stored in a stage 40. Then, in a stage 41, a counter enables the short delay processings to be counted in comparison with the long delay processing. The short delay processings can thus be more frequent than the long delay processings to speed up short delay tripping in case of a strong shortcircuit current.

During processing of the long delay thermal protection functions, in a stage 42, the temperature differences DT1=T1-Ta and DT2=T2-Ta are calculated. Then, in a stage 43, the long delay threshold SLR and short delay threshold SCR are recalculated. The thresholds are calculated at each long delay loop, as the settings of the devices 2c and 2d may change, as may the initial temperatures of the conductors. In a stage 44, a maximum value DT of the temperature differences DT1 and DT2 is detected. Then, in a stage 45, an alarm is given if the maximum value DT exceeds a threshold value proportional to the long delay threshold SLR, for example if DT is greater than 0.95 SLR.

At the end of the long delay processing (stage 46), the maximum value DT of the temperature difference is compared to the long delay threshold SLR. If DT is greater than SLR, a tripping order is sent to the relay 4 in a last stage 49. If DT is not greater than SLR, a stage 47 enables processing to be continued and the short delay function to be carried out.

During the stage 47, the processing unit calculates the variations d(T1)/dt and d(T2)/dt of the conductor temperature values and determines a maximum value d(T)/dt between the two variation values. Calculation may be performed as in the diagram of FIG. 6 using the value of the last sample T1t and the minimum value of the last samples stored in stage 40.

Then, in a stage 48, the maximum value d(T)/dt of the variations is compared to the short delay threshold SCR. If d(T)/dt is greater than SCR, a tripping order is sent in stage 49. If not, processing resumes at stage 39 by acquisition of samples of temperature values T1, T2 and Ta, then by storing in memory in stage 40.

If in stage 41 processing of the long delay functions is not required, processing resumes at stage 47. For example, the counter at stage 41 may direct processing to the long delay functions when it has performed the short delay functions eight times.

Figure 8A:
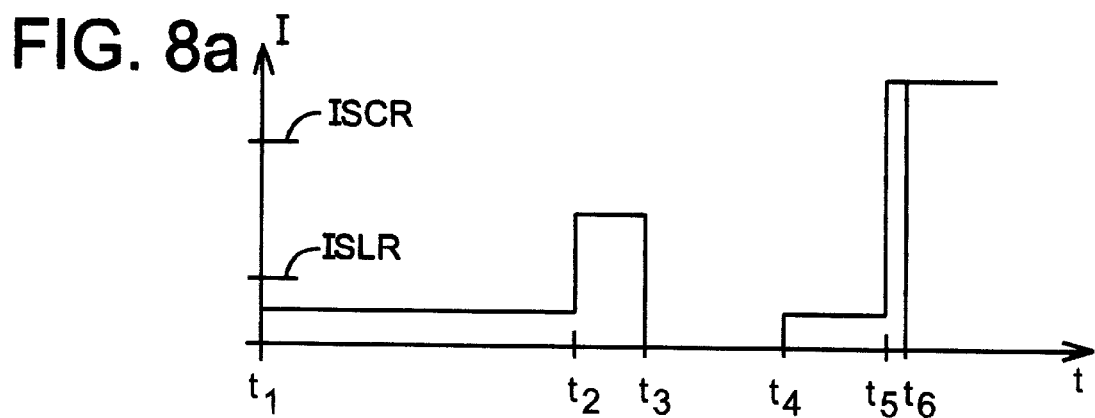
FIGS. 8a to 8d illustrate signals representative of an operation of a relay according to the invention.
Figure 8B:
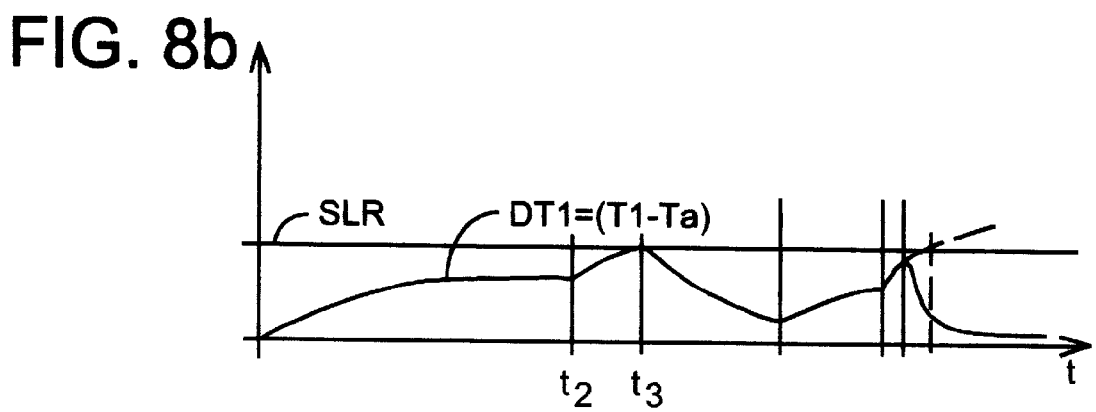
Figure 8C:
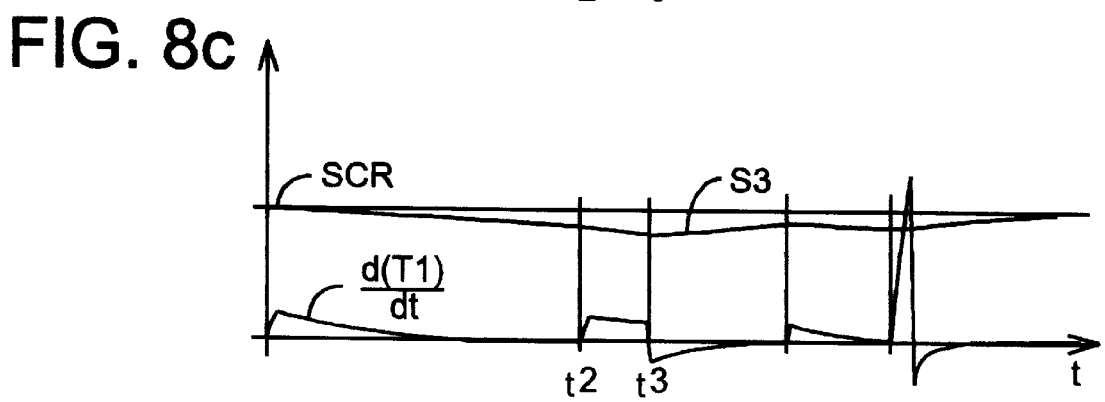
Figure 8D:
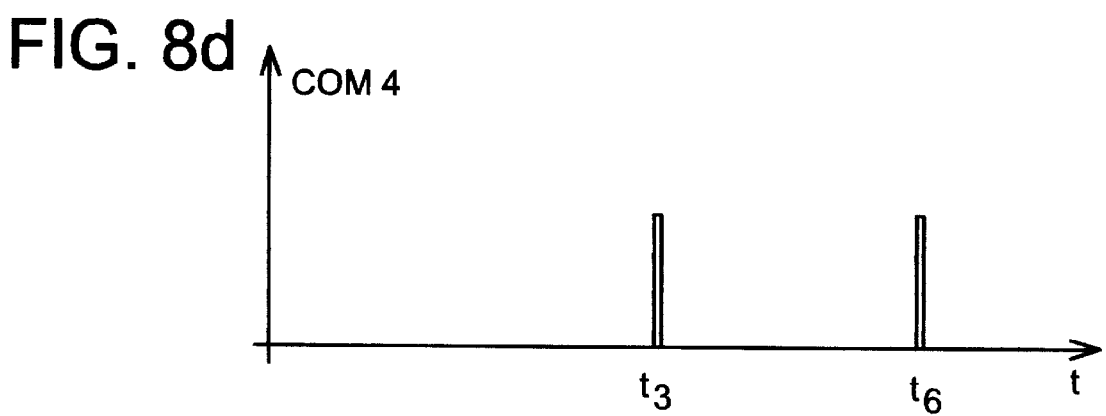

FIGS. 8a to 8d illustrate operation of a protection relay according to an embodiment of the invention. The curve of FIG. 8a represents a current I flowing in a conductor 5 of the power system. The temperature difference between a conductor and the ambient temperature DT1=(T1-Ta) caused by flow of the current I is represented on the curve of FIG. 8b. The curve of FIG. 8c represents the temperature variation d(T1)/dt of the conductor; it corresponds to differentiation of the temperature measurement T1 over time. Finally, FIG. 8d represents tripping orders COM4 sent to the relay 4.

At the time t1, the current I starts flowing. Its value is lower than a threshold ISLR for which a protection relay must not cause opening of a circuit breaker. The temperature difference DT1 (T1-Ta) is small at the beginning, then it increases and stabilizes at a value lower than a long delay thermal tripping threshold SLR. The variation d(T1)/dt is large at the beginning and then decreases when the temperature has stabilized.

At the time t2, the current I exceeds the threshold ISLR. The temperature difference DT1 increases and exceeds the threshold SLR at a time t3. An operating order COM4 is sent to the trip relay to interrupt the current 1. The temperature difference DT1 then decreases as the current is no longer flowing in the conductor.

Then, at a time t4, the current I starts to flow again and the temperature difference DT1 increases. Then, at a time t5, the current increases and exceeds the threshold ISCR, the difference DT1 then increases more rapidly and the variation of T1 (d(T1)/dt) is very high. At a time t6, the variation d(T1)ldt exceeds the short delay tripping threshold SCR and a tripping order COM4 is sent to the relay 4.

In FIG. 8c, a curve representative of a threshold S3 shows a possible correction of the short delay threshold according to the temperature value T1 of the conductor.

The embodiments described above and represented in FIGS. 2, 3, 4 are particularly suited to direct current power systems having a conductor for positive polarity and a conductor for negative polarity. However, the invention also applies to protection relays operating in alternating current having one or more protected poles for single-phase or three-phase power systems.

The processing unit described in the figures comprises two groups of tripping functions, one for each conductor. But the invention also applies for a different number of groups, for example one, three, or four. It is also possible to use several temperature sensors per conductor to be protected.

The circuits used for the processing unit may be analog, digital or programmed. The temperature sensors are preferably of the type with semi-conductors, but other sensors such as thermistors or thermocouples can also be used.

We claim:

1. A protection relay for protecting at least one electrical conductor, which relay comprises a processing unit, said processing unit comprising:

first means for thermal protection comprising means for detecting a temperature variation in a conductor to be protected connected to a first comparator;

first means for setting and supplying a first threshold signal to said first comparator;

first means for measuring a temperature of the conductor to be protected and for supplying a signal representative of the temperature of said conductor to said means for detecting a temperature variation, said first means for measuring a temperature being in thermal contact with said conductor to be protected; and said first means for protection supplying a tripping signal to a contact when a value representative of the variation of the temperature of the conductor to be protected exceeds a value representative of said first threshold signal.

2. The protection relay according to claim 1 wherein the processing unit further comprises second means for thermal protection connected to second means for setting and supplying a second threshold signal, to the first means for measuring, and to second means for measuring a temperature at a distance from a conductor to be protected, said second means for measuring a temperature supplying to a second comparator a second temperature value representative of an ambient temperature, said second means for protection supplying a tripping signal to a contact when a value representative of the temperature difference between the first temperature value supplied by the first means for measuring and the second temperature value supplied to said second comparator by the second means for measuring exceeds a value representative of the second threshold signal.

3. The protection relay according to claim 2 wherein the second means for protection comprises means for determining a quantity of temperature representative of a temperature difference, said second means for protection having inputs connected to the first and second means for measuring a temperature and an output supplying the value representative of the difference between the first temperature value supplied by the first means for measuring and the second temperature value supplied by the second means for measuring.

4. The protection relay according to claim 3 wherein the first means for protection are connected to the output of the means for determining a quantity representative of a temperature difference.

5. The protection relay according to claim 1 wherein the processing unit comprises third means for thermal protection connected to the first means for measuring and said third means supplying a tripping signal to a contact when a value representative of the temperature supplied by the first means exceeds a preset third threshold value.

6. The protection relay according to claim 2 wherein the processing unit comprises means for correction and having inputs connected to the first means for setting a first threshold signal, to the second means for setting and to means for determining a temperature quantity representative of a temperature difference, said means for correction having an output connected to the first means for thermal protection, and said means for correction modifying a value of the first threshold signal according to a value of the second threshold and to the value representative of a temperature difference.

7. The protection relay according to claim 1 wherein the means for detecting a temperature variation comprise means for performing differential calculus and receiving an input signal representative of the temperature signal supplied by the first means for measuring a temperature of the conductor to be protected and supplying to a comparator an output signal representative of a variation of said input signal.

8. The protection relay according to claim 7 wherein the means for performing differential calculus comprise a sampler receiving the input signal, a buffer register connected to the sampler to store a preset number of last samples, a minimum detector connected to the buffer and supplying the value of a stored sample of lowest value, and means for calculating a difference having inputs connected to the sampler and to the minimum detector and an output supplying the output signal representative of the difference between the last sample and the minimum value of the last stored samples.

9. A thermal protection process able to be implemented in a relay according to claim 1 comprising:

a stage in which the temperature of at least one conductor is measured, a stage in which the temperature variation of at least one conductor is calculated, and a tripping control stage according to the value of said temperature variation.

10. A process for using a protection relay to protect at least one electrical conductor, which relay comprises a processing unit, said processing unit comprises first means for thermal protection of a conductor comprising means for detecting a temperature variation in a conductor to be protected, first means for setting and supplying a first threshold signal, first means for measuring a temperature of a conductor to be protected and supplying, when in thermal contact with a conductor to be protected, a signal representative of said temperature, wherein said first means for thermal protection is connected to both said first means for setting and supplying to a comparator said first threshold signal and said first means for measuring the temperature of said conductor to be protected, and means for measuring and supplying to a contact a tripping signal, connected to said means for detecting a temperature variation, said tripping signal being supplied to a contact when a value representative of the variation of the temperature of a conductor to be protected exceeds a value representative of said first threshold signal, said process comprising:

measuring a temperature of at least one conductor;

calculating a temperature variation of at least one conductor; and supplying to a contact a trip signal when said temperature variation exceeds a threshold value.

11. The thermal protection process according to claim 10 further comprising:

measuring an ambient temperature;

calculating a difference between values of a temperature of at least one conductor and said ambient temperature; and supplying a trip signal to a contact according to the value of the temperature difference when said value of the temperature difference exceeds a threshold.

* * * * *